(12) United States Patent
Bhagat

(10) Patent No.: US 6,917,997 B2
(45) Date of Patent: Jul. 12, 2005

(54) INTEGRATED CIRCUIT INCLUDING INTERRUPT CONTROLLER WITH SHARED PREAMBLE EXECUTION AND GLOBAL-DISABLE CONTROL BIT

(75) Inventor: Robin Bhagat, Fremont, CA (US)

(73) Assignee: Palmchip Corporation, Santa Clara, CA (US)

( * ) Notice: Subject to any disclaimer, the term of this patent is extended or adjusted under 35 U.S.C. 154(b) by 575 days.

(21) Appl. No.: 09/802,157

(22) Filed: Mar. 8, 2001

(65) Prior Publication Data

US 2002/0016880 A1 Feb. 7, 2002

Related U.S. Application Data

(60) Provisional application No. 60/214,976, filed on Jun. 29, 2000.

(51) Int. Cl.[7] .............................................. G06F 13/24
(52) U.S. Cl. ...................... 710/261; 710/264; 710/266; 710/267; 712/43
(58) Field of Search ................................. 710/260–269, 710/305–306; 712/19–21, 43, 229

(56) References Cited

U.S. PATENT DOCUMENTS 6,263,396 B1 * 7/2001 Cottle et al. ................. 710/263
6,382,758 B1 * 5/2002 Chausanski et al. .......... 347/17
6,601,126 B1 * 7/2003 Zaidi et al. .................. 710/305

* cited by examiner

Primary Examiner—Paul R. Myers
Assistant Examiner—Raymond N Phan
(74) Attorney, Agent, or Firm—Matthew J Booth & Associates PLLC; Matthew J Booth

(57) ABSTRACT

A interrupt controller includes specialized interfaces and controls for ARM7TDMI-type microcontroller cores. Such sends interrupt vectors and IRQ or FIQ interrupt requests to the processor depending on particular interrupts received. Wherein, THUMB program execution is more economical with program code space, and an interrupt service routine preamble is coded in ARM program code to cause a switch to THUMB program execution. The interrupt service routine preamble is shared amongst all the interrupt service routines to further economize on program code space.

20 Claims, 4 Drawing Sheets

INTEGRATED CIRCUIT INCLUDING INTERRUPT CONTROLLER WITH SHARED PREAMBLE EXECUTION AND GLOBAL-DISABLE CONTROL BIT

RELATED APPLICATIONS

This application claims priority from and incorporates by reference U.S. Provisional Patent Application 60/214,976, filed Jun. 29, 2000, by the present inventor, Robin Bhagat, and four others, and which is titled INTERRUPT CONTROLLER.

BACKGROUND OF THE INVENTION

1. Field of the Invention

The present invention relates generally to interruptible computer systems, and more specifically to an interrupt controller for ARM and THUMB interrupt service routine switching, and that provide an interrupt-disable control bit.

2. Description of the Prior Art

Interrupt mechanisms in microprocessors allow input/output (I/O) and other peripheral controllers to request immediate service. This is more efficient than routinely checking with all such requesters to see if they need service. Interrupt controllers allow several interrupt sources to be prioritized and/or masked. One type of prior art interrupt controller jammed processor instructions on the databus that the processor was expected to execute. Other conventional priority interrupt controllers can cause a processor to branch unconditionally to a reserved section of main memory, e.g., a vector table. Each interrupt level will unconditionally branch the processor to a corresponding part of the vector table. From there, an interrupt service routine (ISR) can be executed that is customized for the particular interrupt priority level.

The ARM7TDMI is a highly popular and broadly licensed synthesizable 32-bit RISC microcontroller core. The "T" in TDMI refers to the so-called "Thumb" 16-bit RISC instruction set execution, the "D" refers to boundary-scan cell arrays for hardware debugging, the "M" refers to a built-in 32-bit arithmetic multiplier, and the "I" refers to an embedded in-circuit emulation (ICE) breaker cell provided for software debugging.

One of the key features of the ARM7TDMI microcontroller is its ability to run two instruction sets, e.g., ARM 32-bit instructions, and Thumb 16-bit instructions. The Thumb instructions are essentially decompressed in real-time during execution into ARM instructions. Executing a "BX" instruction will cause a switch between the two instruction sets. Due to the idiosyncrasies of these instruction sets, a lot of program code space can be saved by running the processor in the Thumb mode. The ARM mode offers higher performance, but at a cost in code space usage.

When an interrupt request is first received, the ARM7TDMI processor will switch, by design, to ARM instruction execution. So if program code space needs to be saved, every ISR will begin with the ARM instructions needed to put the processor in Thumb mode, e.g., a sort of ISR preamble. Similarly, the ends of the ISR's are generally duplicates of one another. For example to return the processor to ARM instruction execution. When program code space is really tight, such duplications are too costly.

SUMMARY OF THE PRESENT INVENTION

Briefly, an interrupt controller embodiment of the present invention includes specialized interfaces and controls for ARM7TDMI-type microcontroller cores. Such sends interrupt vectors and IRQ or FIQ interrupt requests to the processor depending on particular interrupts received.

An advantage of the present invention is that an interrupt controller is provided that allows each interrupt input to be enabled and disabled.

Another advantage of the present invention is that an interrupt controller is provided that allows a global interrupt enable and disable which can be used to protect the critical code execution in the software or operating system.

A further advantage of the present invention is that an interrupt controller is provided that provides for priority-based FIQ and IRQ vectoring.

A still further advantage of the present invention is that an interrupt controller is provided that has programmable fixed-order interrupt priorities.

Another advantage of the present invention is that an interrupt controller is provided that has selectable ISR preamble code vectoring.

These and other objects and advantages of the present invention will no doubt become obvious to those of ordinary skill in the art after having read the following detailed description of the preferred embodiment which is illustrated in the drawings.

IN THE DRAWINGS

DETAILED DESCRIPTION OF THE PREFERRED EMBODIMENTS

Figure 1:
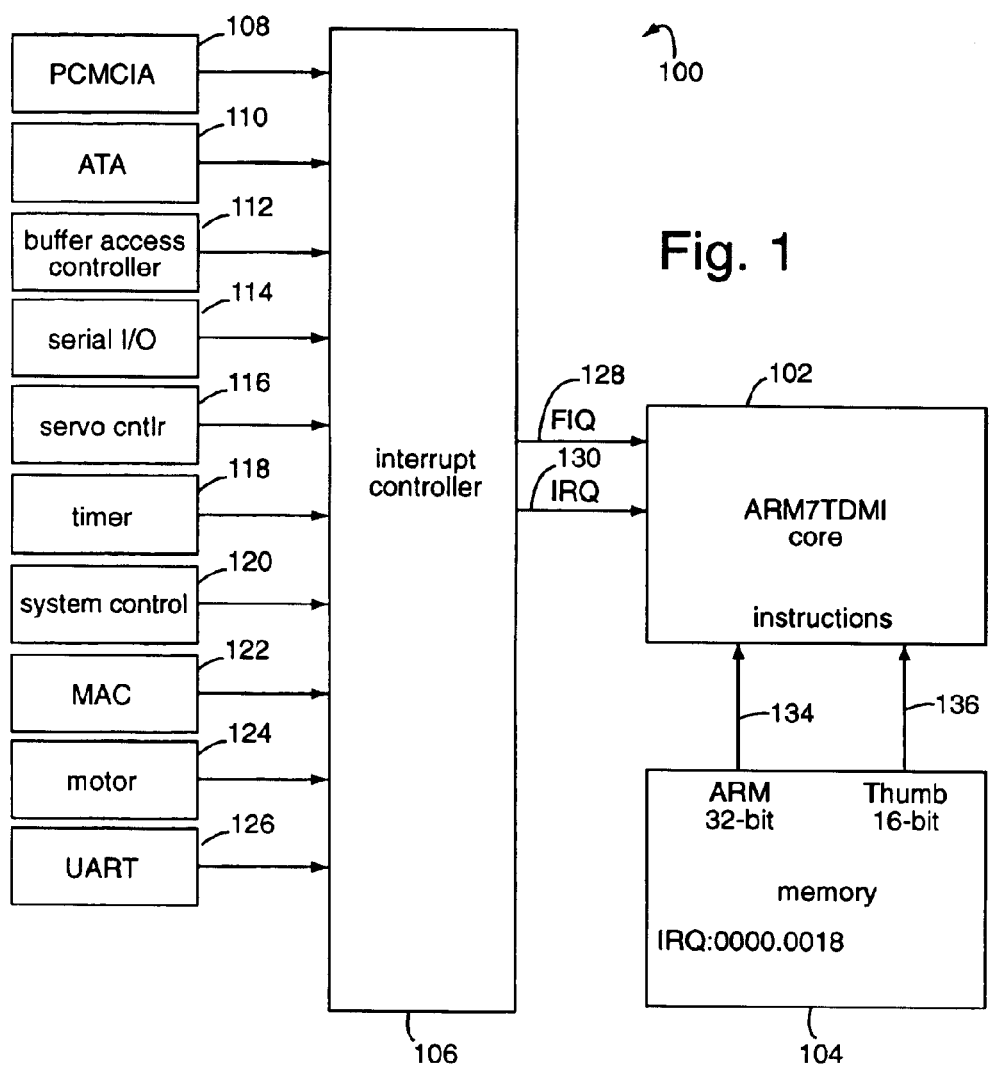
FIG. 1 is a functional block diagram of a microcomputer system embodiment of the present invention.

FIG. 1 illustrates a microcomputer system embodiment of the present invention, and is referred to by the general reference numeral 100. The system 100 comprises an ARM7TDMI synthesizable 32-bit RISC microcontroller core 102 connected to a program code memory 104. A typical ARM7TDMI core die size is less than five square millimeters with 0.6 µm technology. All the components of FIG. 1 are intended to be incorporated on a single integrated circuit die.

An interrupt controller 106 collects and prioritizes a variety of system interrupt sources, e.g., a PCMCIA card 108, an ATA disk controller 110, a buffer-access controller 112, a serial I/O controller 114, a disk servo controller 116, a timer 118, a system control 120, a memory access controller (MAC) 122, a motor 124, and a universal asynchronous receiver-transmitter (UART) 126.

The interrupt controller 106 is able to issue two types of hardware interrupts, a fast interrupt request (FIQ) 128 and a normal interrupt request (IRQ) 130. The processor 102 receives either an ARM 32-bit instruction stream 134 or a Thumb 16-bit instruction stream 136, depending on operating mode. A "BX" instruction execution is needed to switch between operating modes.

The exception processing causes an abrupt change in program flow, and the processor 102 may have multiple instructions in the pipeline in different stages of execution. So it may have to adjust where the program re-starts once the exception processing is complete. Typically, the program counter points two instructions ahead of the currently-executing instruction. Processor 102 automatically saves the current program counter (PC) into a banked register at the beginning of exception processing, and then loads the PC with the exception vector. The specific vector is determined by the exception type. Each vector only provides space for one instruction word, e.g., a branch instruction to the full exception handler, except the FIQ entry which is the last vector entry. Because the FIQ entry is at the end of the list, the exception handler can occupy successive instruction words without needing to branch so FIQ's get the fastest possible servicing.

After exception processing, the PC must be reset. The exception handler may need to account for the effects of the pipeline by "backing up" the saved PC value by one or more instructions. E.g., the prefetch abort exception is invoked when the processor attempts to execute an instruction that could not be (pre-) fetched. By the time the invalid instruction is being "executed", the PC has advanced beyond the instruction causing the exception. On exiting the prefetch abort exception handler, the system software must re-load the PC back one instruction from the PC saved at the time of the exception.

The FIQ is the last entry in the ARM7TDMI vector table so exception processing can begin without requiring a branch. Five "scratch" registers (R8-R12) are banked and available to the exception handler. FIQ exception handlers are preferably written so the registers are not stacked and un-stacked, e.g., to avoid the consequential and inherently slow memory accesses.

Figure 2:
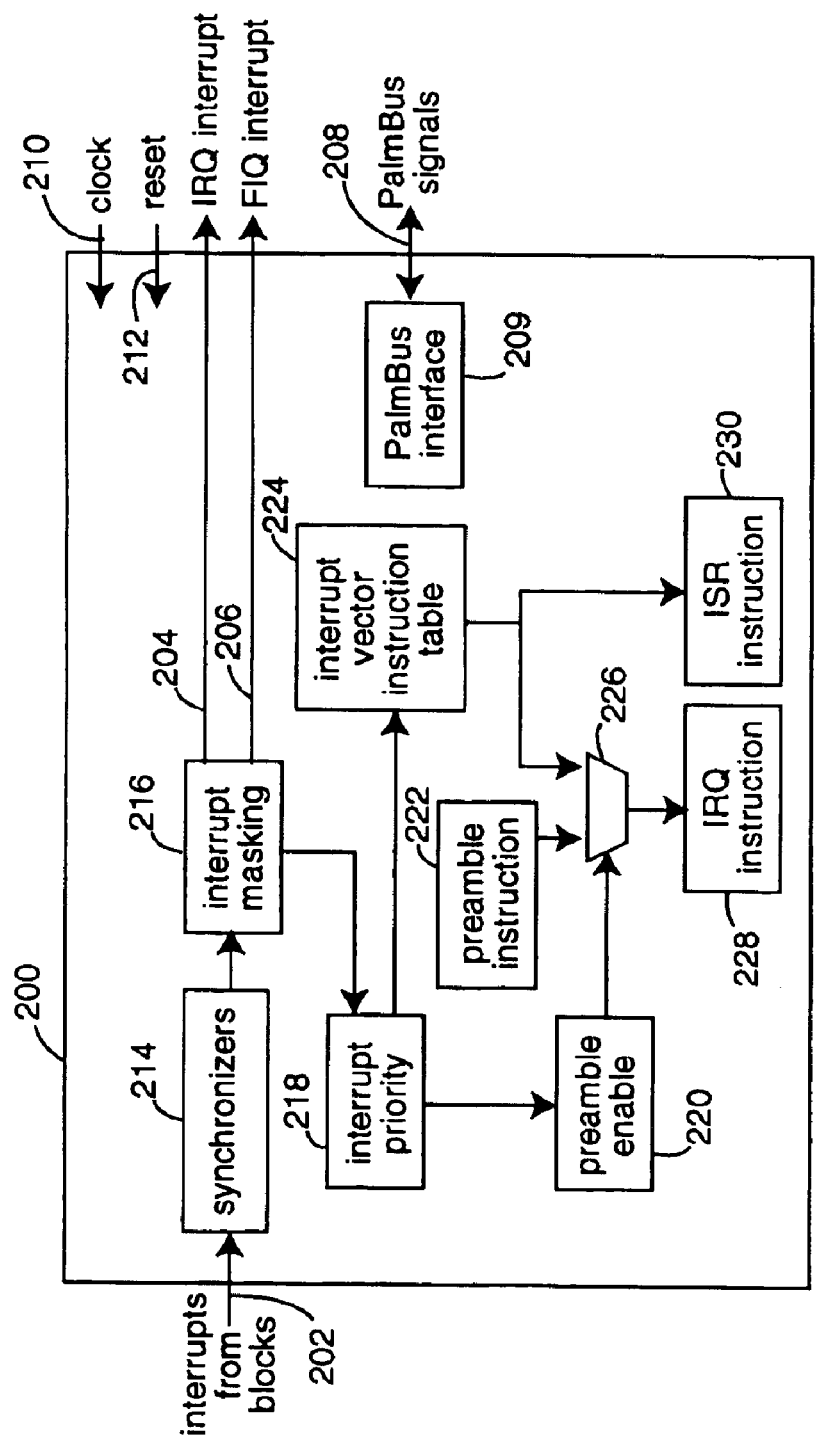
FIG. 2 is a functional block diagram of an interrupt controller embodiment of the present invention.

FIG. 2 represents an interrupt controller 200. An interrupt input 202 receives interrupt requests from various "blocks" within the system, and these are processed into IRQ interrupts 204 and FIQ interrupts 206. A core implementation, such as PALMBUS by Palmchip Corporation (San Jose, Calif.) will include bus interface signals 208 and a bus interface 209. A system clock 210 and a reset 212 are brought in from the processor core. A set of synchronizers 214 receives the interrupt sources. A mask register 216 programmably blocks selected interrupt sources. A prioritizer 218 is connected to a preamble enable 220. A preamble instruction 222 and a vector from an interrupt vector instruction table 224 are combined in a block 226 and issued as an IRQ instruction 228. An ISR instruction 230 is generated from the interrupt vector instruction table 224.

The interrupt controller 200 centralizes all interrupt handling. It preferably includes programmable interrupt masks to independently enable or disable each interrupt source, and one to globally disable all interrupts. It further includes an interrupt vector control that automatically decodes the highest-priority interrupt for presentation of a programmed interrupt vector to the processor.

A cascaded interrupt structure is implemented with a two-level interrupt masking structure. A first masking level exists within the interrupt source itself. If any of the interrupt source's interrupt status bits are set and their corresponding interrupt enable bits are set, its interrupt is asserted. The source interrupt can be incapacitated by disabling all the interrupt bits within the interrupt source. A second interrupt masking level is implemented with the interrupt controller 106. Each interrupt from different interrupt sources may be enabled or disabled, or a global disable may be enforced. All interrupts are cleared at the interrupt source level since they cannot be cleared in the interrupt controller.

The interrupt controller 106 preferably includes a global-disable control bit for use when a critical portion of program code is executing. In such a case, all interrupts must be disabled so the processor will not be interrupted out before that program code completes. Such global disable is preferably independent of individual interrupt masks so the firmware does not need to save and restore the mask states. Not having to save and restore the mask states saves both time and program code, and thus reduces interrupt latency when the global-disable is lifted.

Interrupt vectoring preferably uses a fixed-priority interrupt vector table. A vector priority is provided for each of the FIQ and IRQ interrupts 128 and 130. The FIQ interrupt 128 always has a higher priority than the IRQ interrupt 130 in the ARM7TDMI processor 102.

Interrupt vectoring of the IRQ and FIQ interrupts is critically remapped from memory space, e.g., memory 104, to register space in the system control interrupt source.

Table I lists the registers that were assigned in a prototype of the interrupt controller 106 that was built. This implementation worked with a different set of interrupt sources than is shown in FIG. 1. Each register provides as many as thirty-two accessible bits, i.e., four 8-bit byte memory addresses.

TABLE I

REGISTER SUMMARY

| addr | register | description |
| --- | --- | --- |
| | CONTROL AND STATUS REGISTERS | |
| 00 | INTRAW | |
| 04 | INSTAT | interrupt status |
| 08 | INTENA | global interrupt enable |
| 0C | INTDIS | global interrupt disable |
| 10 | INTMASK | interrupt masks |
| 14 | CURINT | current interrupt |
| | VECTOR INSTRUCTION REGISTERS | |
| 18 | IRQINST | IRQ instruction vector |
| 1C | FIQINST | FIQ instruction vector |
| 20 | ISRINST | ISR instruction vector |
| | PRIORITY DISABLE REGISTERS | |
| 30 | PRIDISCFG | priority disable configuration |
| 34 | PRIDISINST | priority disable instruction |
| | PREAMBLE REGISTERS | |
| 40 | PACFG | preamble configuration |
| 44 | PAINST | preamble instruction |
| | FIQ VECTOR INSTRUCTION REGISTERS | |
| 50 | SVOINST0 | |
| 54 | SVOINST1 | |
| | IRQ VECTOR INSTRUCTION REGISTERS | |
| 60 | DCINST | DC instruction vector |
| 64 | ATAINST | ATA instruction vector |
| 68 | MACINST | MAC instruction vector |
| 6C | SERINST | serial instruction vector |
| 70 | UARTINST | UART instruction vector |
| 74 | PCMCINST | PCMCIA instruction vector |
| 78 | MTRINST | motor instruction vector |
| 7C | TMRINST | timer instruction vector |
| 80 | WDINST | WD instruction vector |
| 84 | DEBGINST | debug instruction vector |

An interrupt status (INTSTAT) register includes FIQ interrupts SVOINT0 and SVOINT1 (bit1, bit0), and its bits 2–11 are IRQ interrupts. The interrupt status bits for both types are arranged in the order of priority in the INTSTAT register. SVOINT0 has priority over SVOINT1 in the case of FIQ interrupts. For the IRQ interrupts the priority decreases from LSB (bit 2) to MSB (bit 9).

Each IRQ interrupt is associated with an instruction, stored in its respective 32-bit instruction register. When an IRQ interrupt is asserted, the ARM7TDMI processor 102 branches to the IRQ vector, address:0000.0018. When such address is remapped to register space using a REMAPIRQ bit in a system control interrupt source 120, the instruction executed from the IRQINST register is taken from the IRQ vector table. Executing the instruction stored in the table saves interrupt decode time before the particular interrupt service routine (ISR) begins.

An interrupt service routine preamble takes advantage of the ARM7TDMI processor's ability to run two instruction sets, ARM 32-bit instructions, and Thumb 16-bit instructions. The switch between the two instruction sets requires that the firmware executes the BX instruction. In order to save program code space, as much program code as possible is run in Thumb mode. But, the ARM7TDMI naturally switches to ARM execution when an interrupt is received. Thus, every ISR generally needs a few instructions to put the processor in Thumb mode. Because this program code is common, and is not actually part of the ISR, it is referred to as an ISR preamble.

The PACFG register facilities in the interrupt controller 106 allow the execution of a preamble before each ISR. This saves program code space by not duplicating the preamble program code for each ISR. If the current interrupt's corresponding preamble enable bit is set in the PACFG register, the contents of the PAINST register are placed in the IRQINST register. If the PACFG bit is reset, the current interrupt's vector instruction is placed in the IRQINST register.

Figure 3:
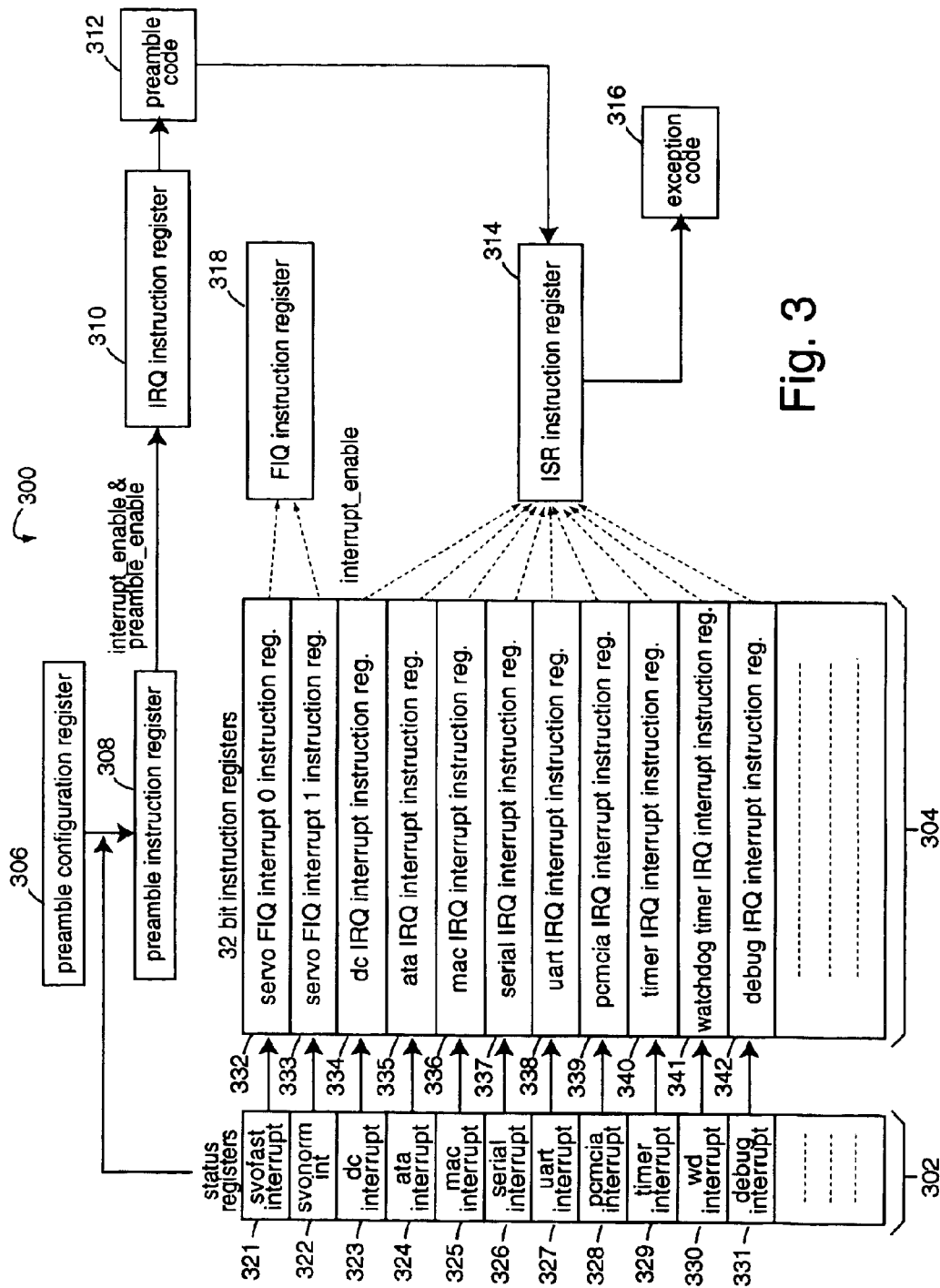
FIG. 3 is a functional block diagram of the resisters and interrelationships in an interrupt controller for interrupt vectoring with an ISR preamble enabled.

FIG. 3 represents interrupt vectoring with the ISR preamble enabled. An interrupt controller 300 includes a set of interrupt status registers 302, a set of 32-bit instruction registers 304, a preamble configuration (PACFG) register 306, a preamble instruction (PAINT) register 308, an IRQ instruction (IRQINST) register 310, a preamble code register 312, an ISR instruction (ISRINST) register 314, an exception code register 316, and an FIQ instruction register 318. A particular prototype unit that was constructed had a dedicated set of interrupt status registers 321–331, with register 321 being the highest priority. It also had a matching set of 32-bit instruction registers 332–342.

If the preamble enable bit in PACFG register 306 of the highest-priority active interrupt is set, the instruction in the PAINT register 308 is executed. The instruction stored in a vector instruction table is generally a branch to the preamble program code. After execution of the preamble program code, firmware should branch to the ISRINST register 314 address. The ISRINST register 314 includes the vector instruction for the current interrupt, which is generally a branch to the interrupt ISR.

Because a higher-priority interrupt may occur between the execution of the ISR preamble and the execution of the corresponding ISR program code, the contents of ISRINST register 314 are preserved from the time the IRQINST register is read to the time the ISRINST register 314 is read. The ISRINST register is updated immediately thereafter.

Figure 4:
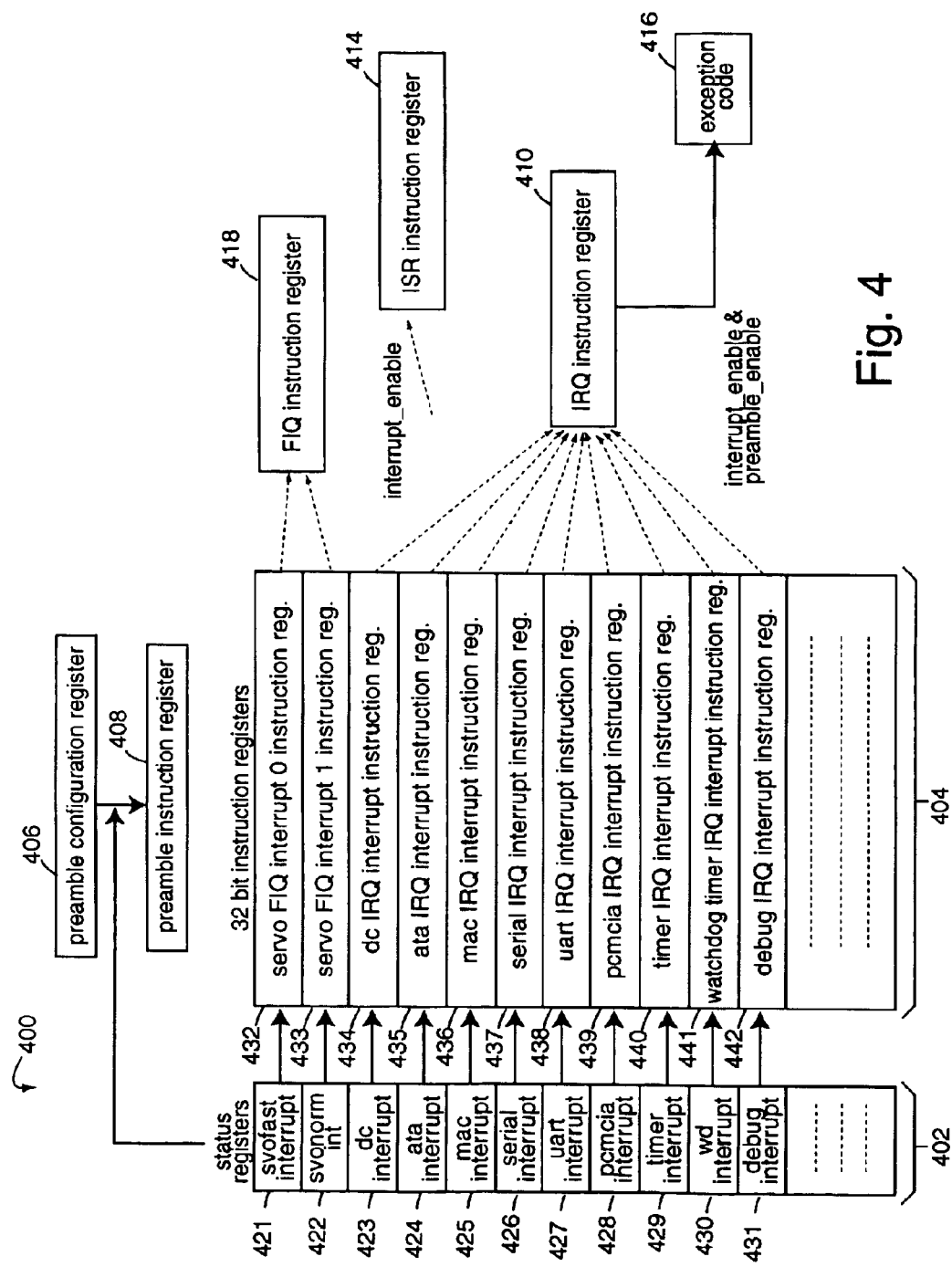
FIG. 4 is a functional block diagram of the resisters and interrelationships in an interrupt controller for interrupt vectoring with the ISR preamble disabled.

FIG. 4 represents interrupt vectoring with the ISR preamble disabled. An interrupt controller 400 includes a set of interrupt status registers 402, a set of 32-bit instruction registers 404, a preamble configuration (PACFG) register 406, a preamble instruction (PAINT) register 408, an IRQ instruction (IRQINST) register 410, an ISR instruction (ISRINST) register 414, an exception code register 416, and an FIQ instruction register 418. A particular prototype unit that was constructed had a dedicated set of interrupt status registers 421–431, with register 421 being the highest priority. It also had a matching set of 32-bit instruction registers 432–442.

If a preamble enable bit in the PACFG register 406 for the highest-priority active interrupt is not set, the interrupt's instruction from the vector instruction table is placed in the IRQINST register 410, allowing firmware to branch directly to the interrupt's ISR program code. In this case, the contents of IRQINST and ISRINST registers 410 and 414 are identical. Without preamble execution, the IRQINST register 410 will change whenever a higher-priority interrupt is asserted. However, once the interrupt has been read the processor enters the IRQ mode and does not exit until the interrupt is completely serviced.

Interrupt servicing may be done without hardware assistance by disabling the vector remapping (addresses 0000.0018 and 0000.001C) in the system control interrupt source 120. ISR execution begins from a read-only memory ROM address if a REMAPRAM bit in the system control interrupt source 120 is '0', or from internal memory if REMAPRAM is '1'.

It may not desirable to re-map the internal memory to the vector addresses (0000.0000), but an ability to modify the interrupt vectors without hardware priority decoding is needed. With vector remapping enabled, all interrupts can be serviced from a common routine by disabling priority decode for all interrupts, e.g., in the PRIDISCFG register. Thus, all interrupts will be serviced by the instruction written to the PRIDISINST register.

The preamble may be used for selective execution of the preamble program code. After preamble program code execution, ISR execution will begin with the PRIDISINST instruction for all interrupts.

The priorities of interrupts are controlled by hardware and cannot be changed with software in this particular implementation. However, some priority modification is allowed, if a few interrupt priorities need to be lowered. The IRQ interrupt priorities can be modified, the FIQ interrupt priority cannot. The hardware vectoring of an IRQ interrupt whose priority needs to be changed can be disabled by setting the corresponding bit in the PRIDISCFG register. If an interrupt's PRIDISCFG bit is set, that interrupt gets the lowest priority. The priority of all the other interrupts remains unchanged. When the highest-priority interrupt asserted has its PRIDISCFG bit set, PRIDISINST register is mapped to the IRQINST register. This will occur only if no other interrupt is set.

If multiple interrupt priorities are to be changed, firmware can use a combination of hardware-determined and firmware-determined priorities. The hardware priority decode is used for higher-priority interrupts and firmware is used to prioritize the rest of the interrupts. Firmware priority is selected by setting the PRIDISCFG bits of the highest-priority interrupt to be modified and of all interrupts which will have a lower priority.

For example, the priority of interrupt-2 can be moved immediately below that of interrupt-4. To do this, the PRIDISCFG bit of interrupt-2 is set; because the priority of interrupts-5 through -9 are to be below that of interrupt-2, their PRIDISCFG bits are also set. If interrupts-0, -1, -3 or -4 are asserted, a hardware priority decoder can map the highest-priority interrupt to the IRQINST register. If interrupt-2 or interrupts-5 through -9 are asserted, the hardware priority decoder maps the PRIDISINST register to the IRQINST register. The PRIDISINST ISR reads the INTSTAT register and checks bit-2, then bits-5 through -9 to determine the interrupt source. It then calls the appropriate interrupt handling routine. If the priority decode for the lower-priority interrupts 5–9 were not disabled, interrupt-2 would have a lower priority than interrupts 5–9.

Such firmware priority decoding is less efficient than full hardware decoding. But hardware priorities can still be used for fast interrupt service, while providing for the other interrupt priorities to be user-defined.

Although the present invention has been described in terms of the presently preferred embodiments, it is to be understood that this disclosure is not interpreted as limiting. Various alterations and modifications will no doubt become apparent to those skilled in the art after having read the above disclosure. Accordingly, it is intended that all appended claims be interpreted as covering all alterations and modifications as falling within the true spirit and scope of the invention.

What is claimed is:

1. A single integrated circuit (IC), comprising:
   a synthesizable ARM-type microcontroller processor core connected to a program code memory that selectively processes either a THUMB or an ARM program execution stream, wherein said THUMB program execution stream is more economical with program code space, and wherein a program-execution interrupt request forces a hardware switch to said ARM program execution stream;
   an interrupt controller that receives interrupt requests and provides a programmable combination of said interrupt requests to the core, wherein each said interrupt request is associated with one of a plurality of interrupt service routines coded in THUMB program code; and
   an interrupt service routine preamble shared amongst said plurality of interrupt service routines, said interrupt service routine preamble is coded in ARM program code to cause a switch to THUMB program execution, said interrupt controller causes the execution of said interrupt service routine preamble before an interrupt service routine is executed.

2. The IC of claim 1 wherein:
   the interrupt controller provides for a fast interrupt request (FIQ) and a normal interrupt request (IRQ) to be programmably masked and prioritized before being issued to the core, and wherein said FIQ directs program execution to a last entry in an interrupt vector table.

3. The IC of claim 1 wherein:
   the interrupt controller centralizes all interrupt handling and includes programmabie interrupt masks for independent enabling and disabling each interrupt source, and for globally disabling all interrupts.

4. The IC of claim 1, wherein:
   the interrupt controller further includes an interrupt vector control for automatically decoding a highest-priority interrupt for presentation of a programmed interrupt vector to the processor core.

5. The IC of claim 1, wherein:
   the interrupt controller includes a global-disable control bit for use when a critical portion of program code is executing that is independent of any individual interrupt masks and avoids needing to save and restore mask states that would otherwise increase interrupt latency when a global-disable is lifted.

6. A system that includes a single integrated circuit (IC), comprising:
   a synthesizable ARM-type microcontroller processor core connected to a program code memory that selectively processes either a THUMB or an ARM program execution stream, wherein said THUMB program execution stream is more economical with program code space than said ARM program execution stream, and wherein a program execution interrupt request forces a hardware switch to said ARM program-execution stream;
   an interrupt controller that receives interrupt requests and provides a programmable combination of said interrupt requests to the core, wherein each said interrupt request is associated with one of a plurality of interrupt service routines coded in THUMB program code; and
   an interrupt service routine preamble shared amongst said plurality of interrupt service routines, said interrupt service routine preamble is coded in ARM program code to cause a hardware switch to THUMB program execution, said interrupt controller causes the execution of said interrupt service routine preamble before an interrupt service routine is executed.

7. The system of claim 6, wherein:
   the interrupt controller provides for a fast interrupt request (FIQ) and a normal interrupt request (IRQ) to be programmably masked and prioritized before being issued to the core, and wherein said FIQ directs program execution to a last entry in an interrupt vector table.

8. The system of claim 6, wherein:
   the interrupt controller centralizes all interrupt handling and includes programmable interrupt masks for independent enabling and disabling each interrupt source, and for globally disabling all interrupts.

9. The system of claim 6, wherein:
   the interrupt controller further includes an interrupt vector control for automatically decoding a highest-priority interrupt for presentation of a programmed interrupt vector to the processor core.

10. The system of claim 6, wherein:
    the interrupt controller includes a global-disable control bit for use when a critical portion of program code is executing that is independent or any individual interrupt masks and avoids needing to save and restore mask states that would otherwise increase interrupt latency when a global-disable is lifted.

11. A method that makes a single integrated circuit (IC), comprising:
    providing a synthesizable ARM-type microcontroller processor core connected to a program code memory that selectively processes either a THUMB or an ARM program execution stream, wherein said THUMB program execution stream is more economical with program code space than said ARM program execution stream, and wherein a program execution interrupt request forces a hardware switch to said ARM program-execution stream;
    providing an interrupt controller that receives interrupt requests and provides a programmable combination of said interrupt requests to the core, wherein each said interrupt request is associated with one of a plurality of interrupt service routines coded in THUMB program code; and
    providing an interrupt service routine preamble shared amongst said plurality of interrupt service routines, said interrupt service routine preamble is coded in ARM program code to cause a hardware switch to THUMB program execution, said interrupt controller causes the execution of said interrupt service routine preamble before an interrupt service routine is executed.

12. The method of claim 11, wherein:

the interrupt controller provides for a fast interrupt request (FIQ) and a normal interrupt request (IRQ) to be programmably masked and prioritized before being issued to the core, and wherein said FIQ directs program execution to a last entry in an interrupt vector table.

13. The method of claim 11, wherein: the interrupt controller centralizes all interrupt handling and includes programmable interrupt masks for independent enabling and disabling each interrupt source, and for globally disabling all interrupts.

14. The method of claim 11, wherein:

the interrupt controller further includes an interrupt vector control for automatically decoding a highest-priority interrupt for presentation of a programmed interrupt vector to the processor core.

15. The method of claim 11, wherein:

the interrupt controller includes a global-disable control bit for use when a critical portion of program code is executing that is independent of any individual interrupt masks and avoids needing to save and restore mask states that would otherwise increase interrupt latency when a global-disable is lifted.

16. A method that processes interrupts using a single integrated circuit (IC), comprising:

receiving one or more program execution interrupt requests, wherein each said interrupt request causes a hardware switch in a synthesizable ARM-type microcontroller processor that selectively processes either a THUMB or an ARM program execution stream wherein said THUMB program execution stream is more economical with program code space than said ARM program execution stream, and wherein said hardware switch forces execution to said ARM program-execution stream;

providing a programmable combination of said interrupt requests to the core using an interrupt controller, wherein each said interrupt request is associated with one of a plurality of interrupt service routines coded in THUMB program code; and executing an interrupt service routine preamble before an interrupt service routine is executed, wherein said interrupt service routine preamble is shared amongst said plurality of interrupt service routines and is coded in ARM program code to cause a hardware switch to THUMB program execution.

17. The method of claim 16, wherein:

the interrupt controller provides for a fast interrupt request (FIQ) and a normal interrupt request (IRQ) to be programmably masked and prioritized before being issued to the core, and wherein said FIQ directs program execution to a last entry in an interrupt vector table.

18. The method of claim 16, wherein:

the interrupt controller centralizes all interrupt handling and includes programmable interrupt masks for independent enabling and disabling each interrupt source, and for globally disabling all interrupts.

19. The method of claim 16, wherein:

the interrupt controller further includes an interrupt vector control for automatically decoding a highest-priority interrupt for presentation of a programmed interrupt vector to the processor core.

20. The method of claim 16, wherein:

the interrupt controller includes a global-disable control bit for use when a critical portion of program code is executing that is independent or any individual interrupt masks and avoids needing to save and restore mask states that would otherwise increase interrupt latency when a global-disable is lifted.

* * * * *